May 15, 1945. W. L. SMITH ET AL 2,375,956
DEVICE FOR REMOVING CASINGS FROM TRUCK WHEELS
Filed Nov. 6, 1943

Inventors
WALTER L. SMITH
LOWELL G. ALFORD
By *A. E. Fisher*
Attorney

Patented May 15, 1945

2,375,956

UNITED STATES PATENT OFFICE 2,375,956

DEVICE FOR REMOVING CASINGS FROM TRUCK WHEELS

Walter L. Smith and Lowell C. Alford, Hermiston, Oreg.

Application November 6, 1943, Serial No. 509,170

1 Claim. (Cl. 157—6)

This invention relates to devices and apparatus for removing heavy truck tires or casings from their wheel rims, which operation ordinarily entails a considerable amount of labor and consumes a lot of time.

It is the primary object of the present invention therefore to provide a machine or apparatus to do this work quickly and efficiently, and which may be operated by one man alone.

Another object of the invention is to provide a tire removing apparatus of the kind referred to, constructed of suitably strong materials of relatively few parts and assembled in a relatively simple manner, including a suitable base with spaced uprights extended therefrom, cross members connecting the upper ends of the side members, shoe supporting members rigidly depended from the under side of the cross members, a number of shoe supporting arms pivotally connected at their inner ends with the outer ends of the shoe supporting members, tire engaging press shoes rigidly mounted at the free ends of the shoe arms, wheel and tire rests on the inner sides of the spaced uprights and arranged in horizontal alignment, whereby a truck wheel with tire mounted thereon may be positioned upon the rests and the press shoes then swung down around and onto the tire, and means at the under side of the wheel and tire for forcing the wheel upwardly through the tire, for removing the latter from the wheel rim.

With the foregoing objects in view, together with such other objects and advantages as may appear from the specification, attention is directed to the accompanying drawing as embodying a preferred form of the invention and wherein.

Figure 1:
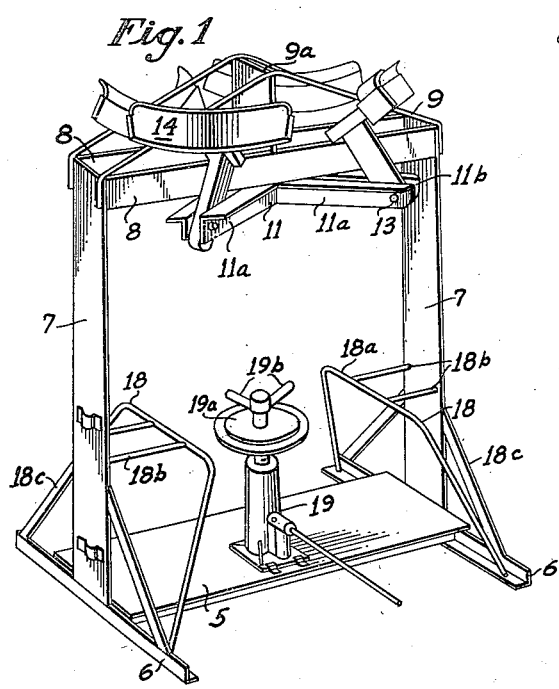
Figure 1 is a perspective view of the complete apparatus, the shoe supporting arms and press shoes being shown in their raised position for permitting the positioning of a wheel and tire upon the rests provided for the purpose.
Figure 4:
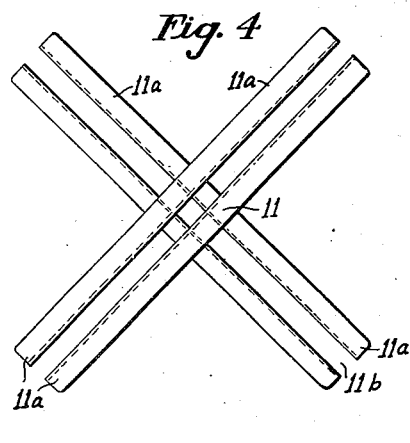
Figure 4 is a plan view on an enlarged scale of the cruciform member for supporting the pivotal shoe supporting arms and shoes.
Figure 5:
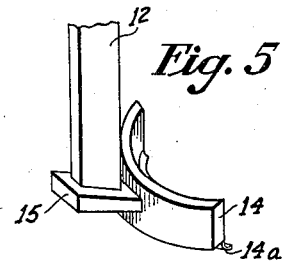
Figure 5 is a detail on an enlarged scale showing one of the press shoes as mounted at the outer end of its shoe arm.
Figure 6:
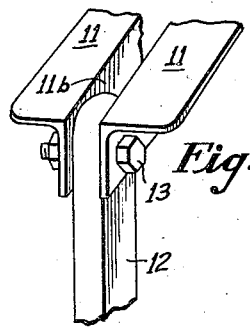
Figure 6 is a detail on an enlarged scale showing the manner of pivotally mounting the shoe supporting arms upon the cruciform member for supporting the said arms.

The invention comprises an oblong flat base 5 supported at its ends upon rigidly joined cross bars 6. Oblong and flat uprights 7 are rigidly seated at their lower ends upon the ends of the base 5 in transverse and parallel alignment, and the upper ends of these uprights are rigidly connected by means of the cross members or braces 8 at each side, the stay rods 9 secured at their ends to the upper ends of the uprights 7, the said rods being bent up angularly in alignment at their medial portions as shown at 9a, and the flat vertical strut or brace 10 which is braced between the angles 9a of the rods 9 and the cross members or braces 8 to which they are secured in any conventional manner.

Figure 2:
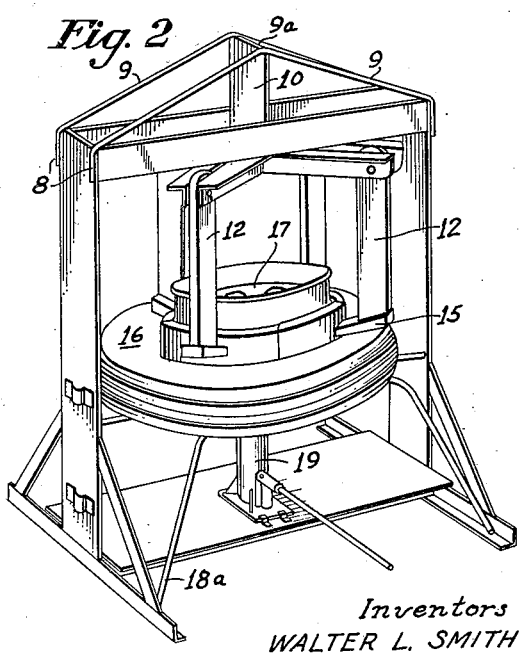
Figure 2 is a similar perspective view, showing a truck wheel and tire properly positioned upon the rests, the shoe supporting arms turned down and the press shoes properly positioned upon the tire, the wheel being shown as partially pressed up through the tire by means of a jack located on the base underneath.
Figure 3:
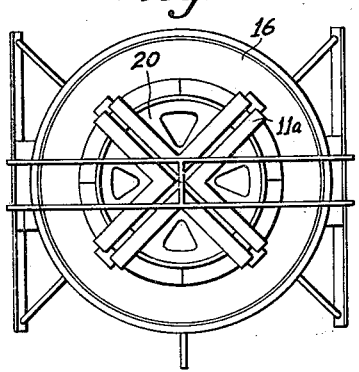
Figure 3 is a top plan view of the assembly of Figure 2.

A cruciform shoe arm supporting member 11 is rigidly mounted centrally to the under sides or edges of the cross braces 8, being securely anchored thereto in any conventional manner, the said member 11 having two of its arms, as 11a disposed regularly at one side of the assembly and the other two arms 11a disposed at the opposite side of the assembly, as clearly shown in the drawing. The arms 11a are bifurcated at their outer ends as shown at 11b, and press shoe supporting arms 12 are pivotally connected at their inner ends within these forked ends, by means of bolts as shown at 13. Arcuate press shoes 14 are medially joined one each to the outer ends of the arms 12 by means of the intervening shank portions 15 which are rigidly anchored to the ends of the arms and also medially to the outer convexed sides of the press shoes. Thus there are four arcuate press shoes, and the dimensioning and arrangement of the parts are such that when the arms 12 and press shoes 14 are lowered upon the tire 16 as shown in Figure 2, the curvature of the shoes will correspond with the curvature of the tire, and when positioned thereupon they will completely cover the tire and encircle same around its upper side, as shown. The shoes 14 are formed at their lower inner margins with projecting lips 14a which are adapted to seat closely next to the wheel rim 17 when the shoes are lowered and positioned upon the tire in their operative situation.

A pair of tire supporting brackets or rests 18 are mounted in horizontal alignment upon the inner faces of the uprights 7. These rests may be of any desired form, but as here shown they comprise rods 18a bent to the form of an inverted U and having their ends anchored to the cross bars 6 at either side of the uprights 7, the rods 18a being inclined inwardly from the uprights at their upper or bight portions, in which position they are rigidly fixed by means of short stay rods 18b extended horizontally between the uprights 7 and the bight portions of the rods 18a, and rigidly joined thereto at their ends. The rests are completed by means of braces 18c extended angularly between the uprights 7 at their upper ends and the cross bars 6 at their lower ends, and rigidly joined thereto.

Upon the flat base 5 is mounted any conventional form of jack, such as the compressed air jack indicated at 19, the upper end of the piston rod of the jack having mounted thereon a special form of head 19a for engaging the under side of the wheel 20 upon which the rim 17 and tire 16 are mounted, and there being fingers 19b extended from this head for passing into the hub of the wheel.

In use the heavy truck wheel and casing is positioned horizontally upon the supporting brackets or rests, and the press shoe supporting arms and press shoes are turned vertically down so that the press shoes rest upon the upper side of the casing and completely encircle the casing next to the wheel rim, with the projecting lips of the shoes close against the rim. The jack is then operated so as to raise the wheel upwardly, thus pressing the wheel out from the casing, after which the press shoes and supporting arms are again elevated for the purpose of clearing and freeing the casing.

While we have here shown and described specific structural features of the invention, the same may be changed as desired, within the scope of the appended claim.

We claim:

In a device of the kind described including a rectangular supporting frame including a base, laterally spaced uprights and upper end cross braces for the uprights, horizontally aligned wheel and casing brackets on the inner sides of the uprights, a cruciform shoe arm supporting member rigidly and centrally mounted to the under sides of the upper cross braces, said member having four equal arms, two on each side of the upper cross braces and extended in right angled relationship to each other, press shoe supporting arms pivotally connected at their inner ends to the extremities of the cruciform shoe arm supporting member and adapted to swing in vertical arcs downwardly into operative position, and upwardly into inoperative position to clear the space between said uprights, arcuate press shoes horizontally and medially joined to the outer ends of these said arms and adapted to close down upon a truck tire casing as mounted upon a truck wheel and positioned upon the wheel and casing brackets, for holding the casing against upward movement, and means supported upon the base of the frame for pressing the truck wheel upwardly through the casing for removing the latter.

WALTER L. SMITH.
LOWELL C. ALFORD.